United States Patent [19]
Kawakubo

[11] Patent Number: 5,955,991
[45] Date of Patent: Sep. 21, 1999

[54] RADAR APPARATUS

[75] Inventor: Atsushi Kawakubo, Susono, Japan

[73] Assignee: Toyota Jidosha Kabushiki Kaisha, Japan

[21] Appl. No.: 09/177,105

[22] Filed: Oct. 22, 1998

[30]    Foreign Application Priority Data

Nov. 28, 1997 [JP] Japan .................................. 9-328644

[51] Int. Cl.$^6$ .............................. H01Q 3/02; H01Q 3/12
[52] U.S. Cl. ...................... 342/374; 342/108; 342/127; 342/145
[58] Field of Search .................................. 342/108, 127, 342/145, 374, 382, 165, 174, 368

[56]          References Cited

U.S. PATENT DOCUMENTS

| | | | |
|---|---|---|---|
| 3,103,009 | 9/1963 | Baker | 342/382 |
| 4,121,221 | 10/1978 | Meadows | 343/854 |
| 4,924,234 | 5/1990 | Fujisaka et al. | 342/374 |
| 5,225,839 | 7/1993 | Okurowski et al. | 342/174 |

FOREIGN PATENT DOCUMENTS 6-88869   3/1994   Japan .

*Primary Examiner*—Thomas H. Tarcza
*Assistant Examiner*—Dao L. Phan
*Attorney, Agent, or Firm*—Finnegan, Henderson, Farabow, Garrett & Dunner L.L.P.

[57]          ABSTRACT

An object is to provide a cheap digital beamforming radar apparatus. For achieving it, the radar apparatus of the present invention comprises a transmit section for radiating a transmit signal in the form of an electromagnetic wave, an array antenna comprised of a plurality of antenna elements for receiving an electromagnetic wave re-radiated from an object when the electromagnetic wave of the transmit signal reaches the object, as a receive signal, a switching device for connecting either one of the antenna elements to a predetermined terminal in an alternative way by a switching signal, a receive section for downconverting the receive signal obtained from the predetermined terminal by use of part of the transmit signal to generate a difference signal between the transmit signal and the receive signal and converting this difference signal to a digital signal, and a digital signal processing section for subjecting the digital signal from the receive section to a predetermined process to detect a distance to the object or a relative velocity of the object.

5 Claims, 12 Drawing Sheets

RADAR APPARATUS

BACKGROUND OF THE INVENTION

1. Field of the Invention

The present invention relates to a radar apparatus that performs signal processing on a digital basis and, more particularly, to a radar apparatus of a digital beamforming (DBF) type provided with an array antenna consisting of a plurality of antenna elements to form antenna beams by digital processing.

2. Related Background Art

An example of the radar apparatus of the DBF type is the one described in Japanese Laid-open Patent Application No. 6-88869. In this conventional radar apparatus, an RF amplifier, a mixer, a filter, and an A/D converter are connected to each of the antenna elements forming the array antenna and digital signals outputted from the respective A/D converters are taken into a digital beamforming processor to be subjected to a digital beamforming process.

In general, the radar apparatus uses high-frequency electromagnetic waves such as microwaves or millimeter waves, and analog devices (such as the RF amplifiers and mixers) operating at such high frequencies are very expensive.

The conventional radar apparatus described above needs a lot of analog devices, because these analog devices are provided for each of the antenna elements. Therefore, high production cost is unavoidable. Particularly, a means for improving performance can be increase in the number of antenna elements, but the increase of the antenna elements will result in increasing the number of high-frequency analog devices attendant thereon and in turn increasing the cost. This was the hindrance against the increase in the number of antenna elements. The increase in the number of analog devices will also result in increasing the scale of the radar apparatus.

SUMMARY OF THE INVENTION

The radar apparatus of the present invention has been accomplished to solve the problems stated above, and the radar apparatus of the invention comprises a transmit section for radiating a transmit signal in the form of an electromagnetic wave, an array antenna comprised of a plurality of antenna elements for receiving an electromagnetic wave re-radiated from an object when the electromagnetic wave of the transmit signal reaches the object, as a receive signal, switching means for connecting either one of the antenna elements to a predetermined terminal in an alternative way by a switching signal, a receive section for downconverting the receive signal obtained from the predetermined terminal by use of part of the transmit signal to generate a difference signal between the transmit signal and the receive signal and converting this difference signal to a digital signal, and a digital signal processing section for subjecting the digital signal from the receive section to a predetermined process to detect a distance to the object or a relative velocity of the object.

The switching operation of the switching means permits the receive signals received by the respective antenna elements to be input to the receive section in order in time division and in repetitive manner. The receive section downconverts each of the receive signals successively input from the respective antenna elements to generate the difference signal between the transmit signal and the receive signal and a series of difference signals are converted to digital signals element by element. The digital signal processing section subjects the digital signals from the receive section to the predetermined process to detect position information or velocity information of the object. Since the signals from the respective antenna elements are input in series to the receive section, only a set of devices suffice for downconverting without having to prepare such devices for each of the antenna elements. In a preferred embodiment, the switching means is adapted to interrupt connection between output terminal and input terminal by an intermittent signal of a frequency higher than a frequency of the switching signal and lower than a frequency of the transmit signal, and the receive section is adapted to downconvert the receive signal from the switching means by use of part of the transmit signal and further downconvert the thus downconverted signal by use of the intermittent signal to generate the difference signal.

Since the receive section generates the difference signal between the transmit signal and the receive signal by the two-stage downconverting, it can effectively separate and eliminate the 1/f noise, FM-AM conversion noise, etc., which the so-called homodyne detection employing single-stage downconverting was unable to separate and eliminate. Since the frequency of the signal obtained by the first-stage downconverting is raised by the degree corresponding to that of the intermittent signal, the signal can be separated from the noise components of low frequencies.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
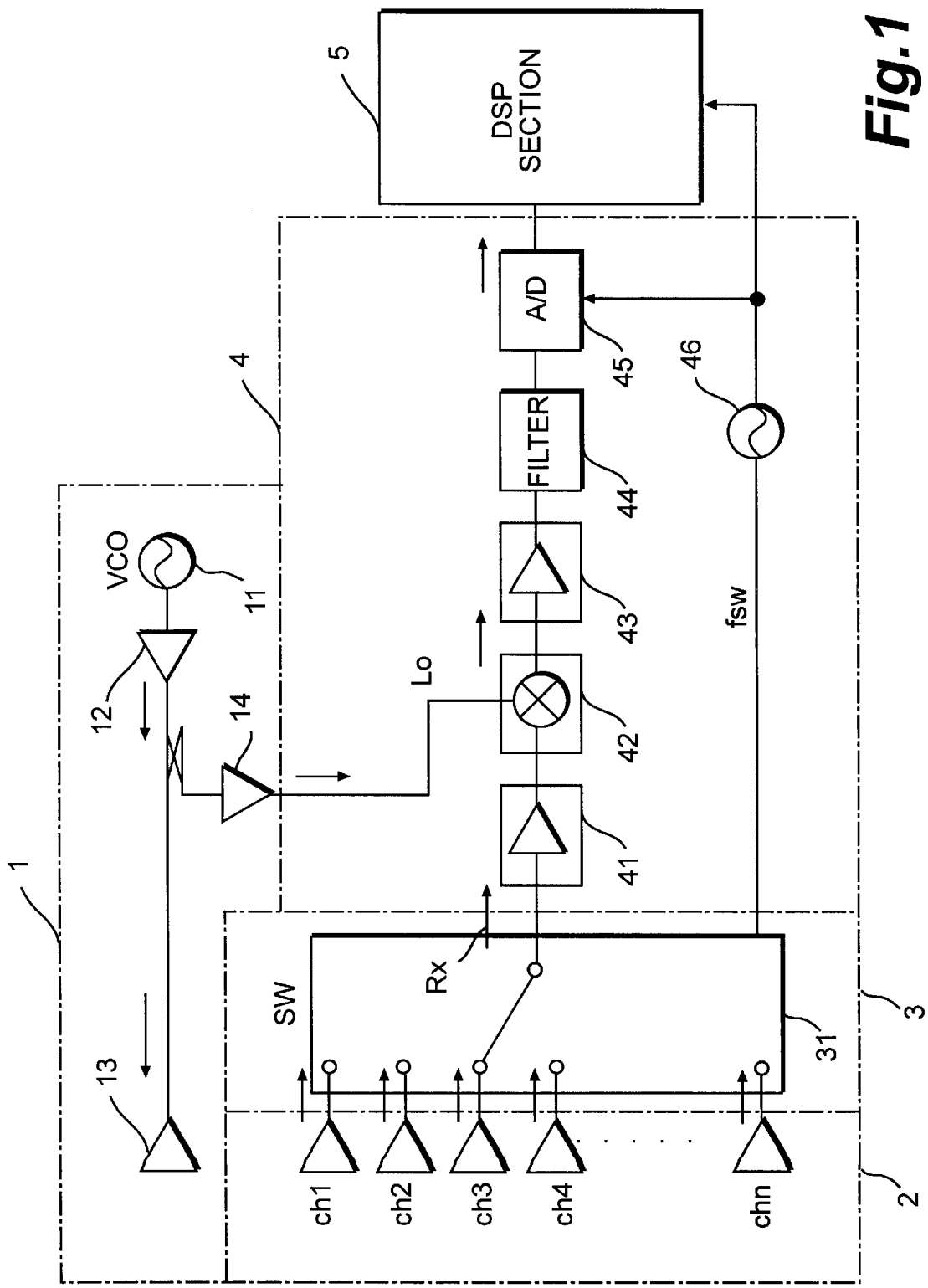
FIG. 1 is a structural diagram to show the radar apparatus of an embodiment of the present invention.

FIG. 1 is a structural diagram to show the radar apparatus which is as an embodiment of the present invention. This radar apparatus is an FM-CW radar apparatus using a transmit signal resulting from frequency modulation (FM) of continuous wave (CW) and is also DBF radar apparatus to perform the digital beamforming process.

The principle of detection by the FM-CW radar and the fundamental concept of the DBF technology will be described prior to description of specific structure and operation of the present embodiment.

Figure 2A:
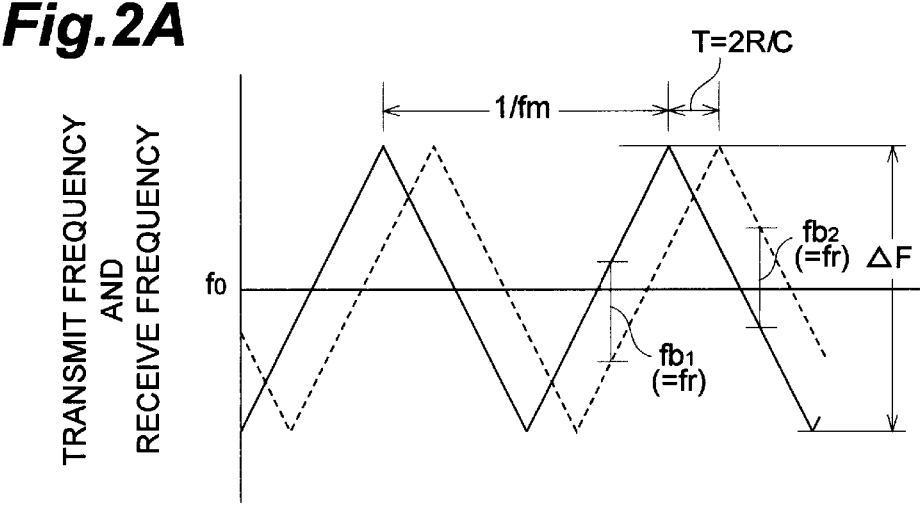
FIG. 2A and FIG. 2B are graphs for explaining the principle of detection by FM-CW radar.
Figure 2B:
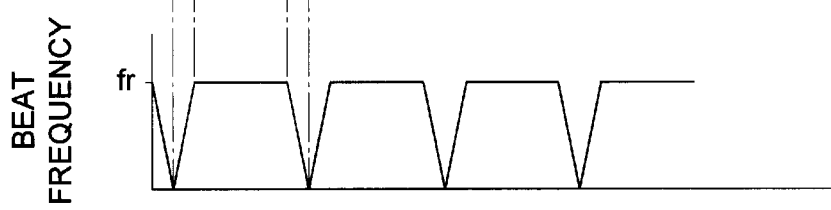
Figure 3A:
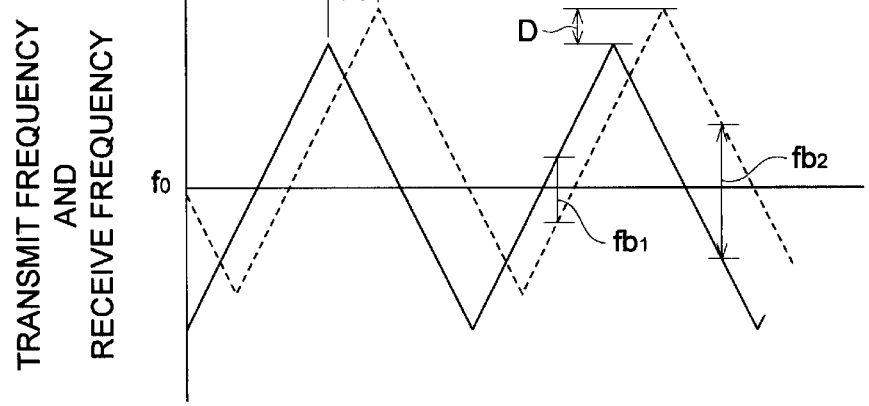
FIG. 3A and FIG. 3B are graphs for explaining the principle of detection by FM-CW radar.

First, the principle of detection by the FM-CW radar will be described referring to the graphs of FIGS. 2A and 2B and FIGS. 3A and 3B. FIG. 2A is a graph to show change in transmit frequency, and change in receive frequency of re-radiated beam from a target located at a position the distance R apart and moving at the relative velocity of zero, wherein the ordinate indicates the frequency and the abscissa the time. The solid line indicates the frequency of transmit signal and the dashed line the frequency of receive signal. As apparent from this graph, the transmit signal is a modulated signal resulting from triangular frequency modulation of continuous wave. The center frequency of the modulated wave is f0, the frequency shift width $\Delta F$, and the repetition frequency of the triangular wave fm. FIG. 3A is a graph to indicate change in receive signal when the relative velocity of the target is not zero but velocity V, wherein the solid line represents the frequency of transmit signal and the dashed line the frequency of receive signal. The definition of the transmit signal and coordinate axes is the same as in FIG. 2A.

It is understood from FIG. 2A and FIG. 3A that the receive signal under radiation of such transmit signal experiences a time delay T (T=2R/C: C is the speed of light) according to the range R when the relative velocity of the target is zero and that the receive signal experiences the time delay T according to the range R, and a frequency shift D commensurate with the relative velocity when the relative velocity of the target is V. The example shown in FIG. 3A indicates the case where the frequency of the receive signal is shifted up in the same graph and thus the target is approaching.

Figure 3B:
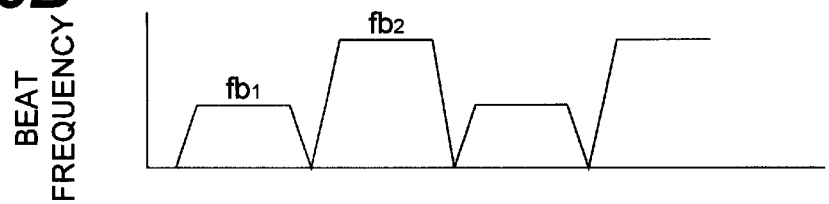

When this receive signal is mixed with part of the transmit signal, a beat signal will be obtained. FIG. 2B and FIG. 3B are graphs to show the beat frequency when the relative velocity V of the target is zero and when the relative velocity V is not zero, respectively, wherein the time axis (abscissa) is timed with that of FIG. 2A or FIG. 3A, respectively.

Now, let fr be the beat frequency at the relative velocity of zero, fd be the Doppler frequency based on the relative velocity, fb1 be the beat frequency in frequency-increasing intervals (up intervals), and fb2 be the beat frequency in frequency-decreasing intervals (down intervals). Then the following equations hold.

$$fb1 = fr - fd \quad (1)$$

$$fb2 = fr + fd \quad (2)$$

Hence, fr and fd can be calculated from the following equations (3) and (4) by separately measuring the beat frequencies fb1 and fb2 in the up interval and in the down interval, respectively, of the modulation cycles.

$$fr = (fb1 + fb2)/2 \quad (3)$$

$$fd = (fb2 - fb1)/2 \quad (4)$$

Once fr and fd are obtained, the range R and the relative velocity V of the target can be calculated from the following equations (5) and (6).

$$R = (C/(4 \cdot \Delta F \cdot fm)) \cdot fr \quad (5)$$

$$V = (C/(2 \cdot f0)) \cdot fd \quad (6)$$

In the above equations, C indicates the speed of light.

The range R and relative velocity V of the target can be obtained for an arbitrary beam direction as described above and, therefore, the direction, range, and relative velocity of the target can be determined by successively calculating the range R and relative velocity V with scanning of beam. This is the principle of the FM-CW radar.

Next, the fundamental concept of the digital beamforming (DBF) technique utilized in the present invention will be described. The DBF is a technique for taking receive signals of an array antenna composed of a plurality of antenna elements through analog-to-digital conversion into a digital signal processing section and for actualizing beam scanning and adjustment of sidelobe characteristics etc. in the digital signal processing section. The principle of the beam scanning by DBF is easier to understand when compared with a phased array antenna radar, and, therefore, the phased array antenna radar will be described first.

Figure 4:
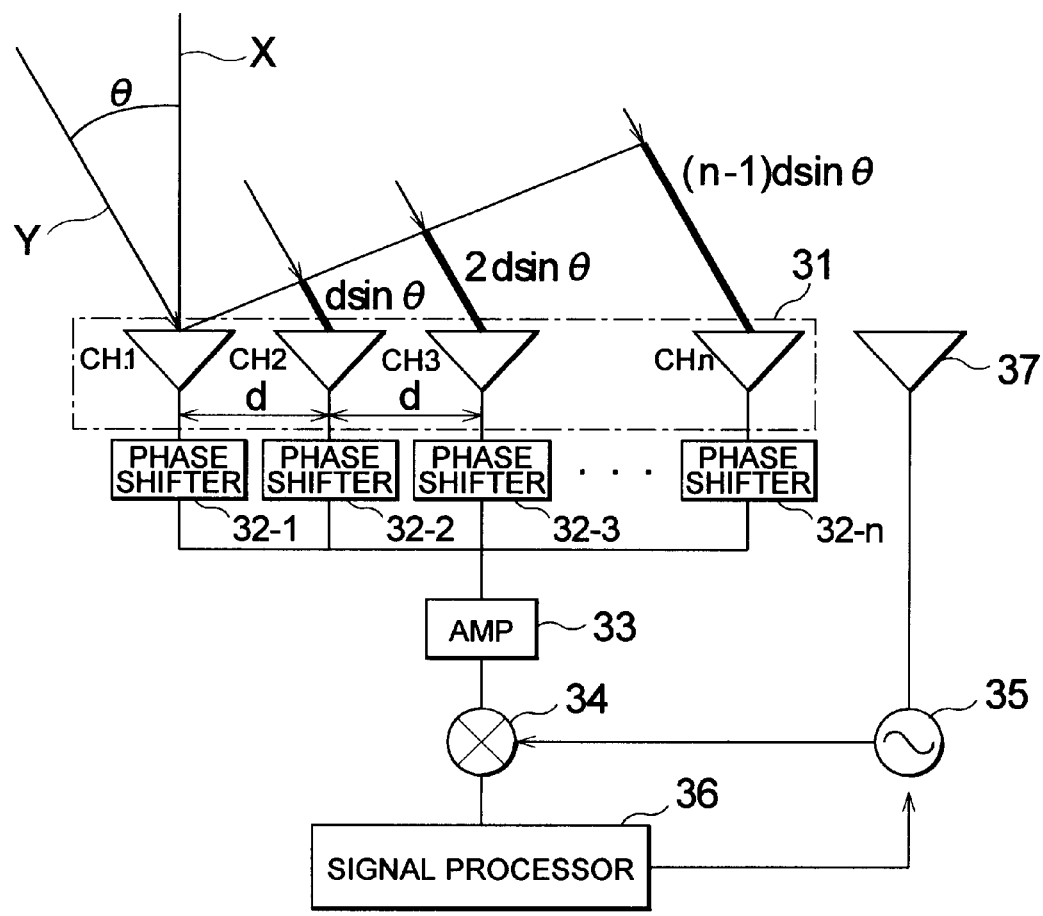
FIG. 4 is a diagram for explaining the principle of a phased array antenna.

FIG. 4 is a diagram to show the fundamental structure of the phased array antenna radar. When an array antenna 31 consisting of n antenna elements arranged at the spacing d receives the radio wave coming from the direction Y which makes the angle $\theta$ to the center direction X of the radar, each propagation path length to the antenna element (CH2), ..., or the antenna element (CHn) is $d\sin\theta$, ..., or $(n-1)d\sin\theta$, respectively, longer than that of the radio wave to the antenna element (CH1), as shown in FIG. 4. Accordingly, the phase of the radio wave reaching the antenna element (CH2), ..., or the antenna element (CHn) lags the phase of the radio wave reaching the antenna element (CH1) by that degree.

This phase delay is $(2\pi d\sin\theta)/\lambda$, ..., or $(2(n-1)\pi d\sin\theta)/\lambda$ for each of the antenna elements. Here, $\lambda$ is the wavelength of the radio wave. This delay is restored by a phase shifter 32-1 to 32-n provided at the back end of each antenna element so as to put the phase forward, whereby the radio wave from the Y direction is received in the same phase by the all antenna elements. This means that the directivity is set in the $\theta$ direction. The signal processing after synthesis of the receive signals passing through the respective phase shifters is the same as in the case of the mechanical scanning; the signal is amplified by low-noise amplifier 33, then the signal is downconverted by being mixed with the transmit signal outputted from oscillator 35, in mixer 34, and the signal is sent to signal processing circuit 36. Numeral 37 denotes a transmit antenna.

With this phased array antenna radar, the directivity can be changed to an arbitrary direction in a fixed state of the array antenna composed of the antenna elements, by properly controlling the phase shift amounts of the respective phase shifters.

Figure 5:
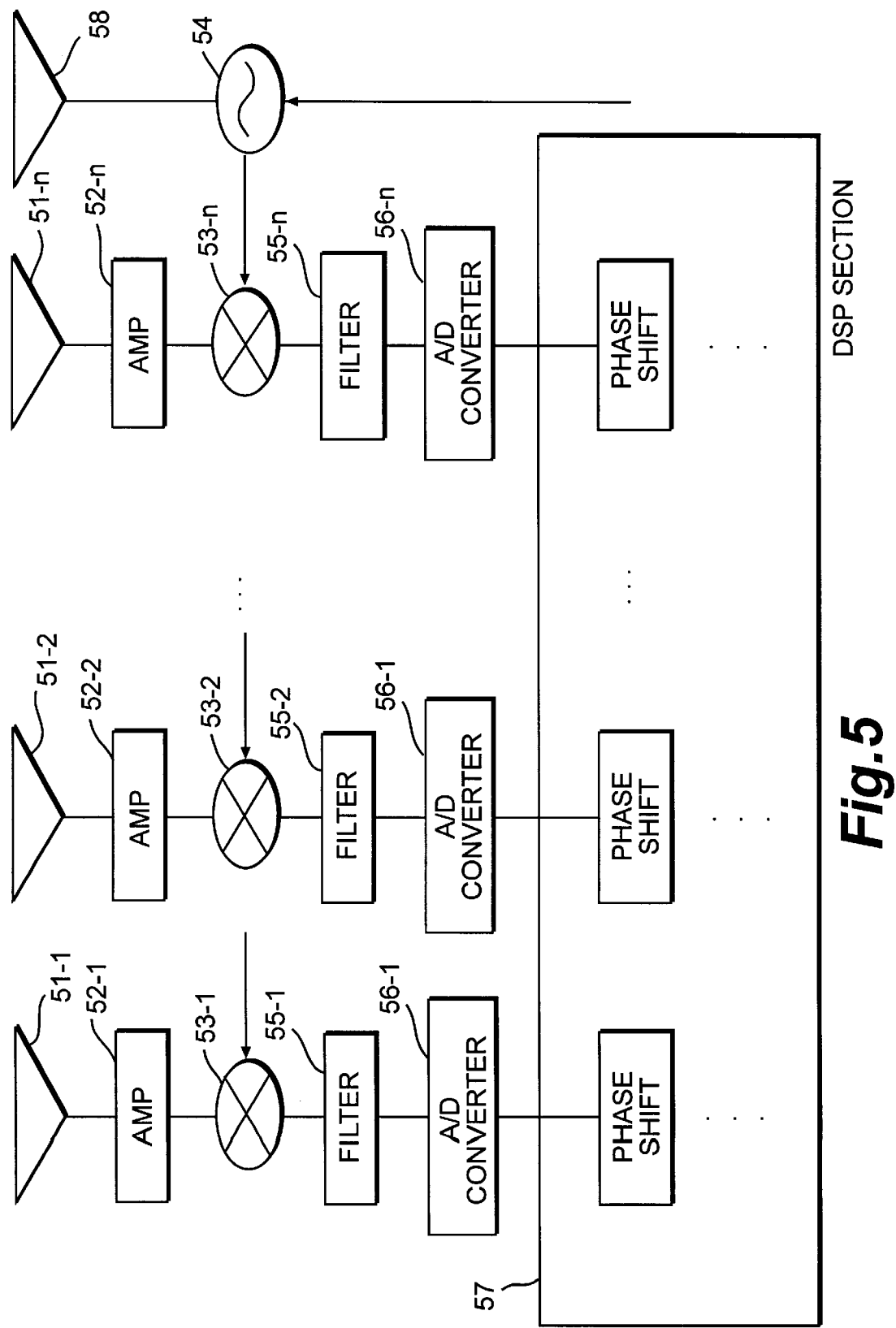
FIG. 5 is a diagram for explaining the principle of a digital beamforming (DBF) antenna.

The DBF radar employs the digital signal processing to achieve the function of the phase shifters of the phased array antenna radar. FIG. 5 illustrates the fundamental structure of the DBF radar. A low-noise amplifier 52-1 to 52-n is provided for each antenna element 51-1 to 51-n and a signal from each amplifier is downconverted in an associated mixer 53-1 to 53-n. The signal after the downconversion is filtered in filter 55-1 to 55-n, thereafter the analog signal is converted to a digital signal by A/D converter 56-1 to 56-n, and the digital signal is sent to digital signal processing (DSP) circuit 57. Numeral 58 denotes the transmit antenna.

Since the DSP circuit 57 can freely change the phase and amplitude, the directivity of the antenna can be determined in an arbitrary direction and in an arbitrary shape by subjecting the digital receive signals of the respective channels to phase and amplitude conversion according to a certain rule and synthesizing the signals of the all channels. This is called digital beamforming (DBF).

A principal feature of the DBF is that once the signals of the all antenna elements (all receive channels) are taken in as digital signals, a beam can be synthesized in an arbitrary direction, based thereon, and, therefore, a plurality of beams can be created from one signal capture.

The radar apparatus as an embodiment of the present invention illustrated in FIG. 1 is constructed in such structure that the principle of DBF described above is applied to the FM-CW radar apparatus and that the whole apparatus is equipped with only one set of analog devices such as the RF amplifier and mixer, which were provided for each of the antenna elements in the conventional DBF radar apparatus.

The radar apparatus of the invention is provided with transmit section 1, array antenna 2, switch 3, receive section 4, and digital signal processing section 5.

The transmit section 1 is provided with voltage-controlled oscillator 11 having the center frequency of f0 (for example, 60 GHz), buffer amplifier 12, transmit antenna 13, and RF amplifier 14. The oscillator 11 outputs the modulated wave (transmit signal) of $f0 \pm \Delta F/2$ by control voltage outputted from a dc power supply for modulation not illustrated. The modulated wave is amplified by the buffer amplifier 12 to be radiated as an electromagnetic wave from the transmit antenna 13. Part of the transmit signal is amplified by the RF amplifier 14 and the amplified signal is outputted as a local signal for detection of receive signal.

The array antenna 2 for reception is provided with n antenna elements respectively corresponding to channels from the first channel (CH1) to the n-th channel (CHn). The switch 3 has n input terminals and one output terminal and each antenna element of the array antenna 2 is connected to an associated input terminal. The output terminal is arranged to be connected to either one of the input terminals and the connection is switched at regular intervals by switching signal (clock signal). The switching of connection is electrically conducted on the circuitry.

The receive section 4 is provided with RF amplifier 41, mixer 42, amplifier 43, filter 44, A/D converter 45, and switching signal oscillator 46. A signal outputted from the output terminal of the switch 3, which is a signal received by either antenna element of the array antenna 2, is amplified by the RF amplifier 41 and the amplified signal is mixed with part of the transmit signal from the RF amplifier 14 in the mixer 42. This mixing causes the receive signal to be downconverted, thereby creating a beat signal which is a difference signal between the transmit signal and the receive signal. The beat signal is input through the amplifier 43 and low-pass filter 44 into the A/D converter 45 to be converted to a digital signal at the timing of an output signal from the oscillator 46, i.e., at the timing of the clock signal for switching of connection in the switch 3.

The digital signal processing section 5 carries out the digital beamforming (DBF) based on the aforementioned principle with the input of the digital beat signal from the A/D converter 45.

Next described is the overall operation of the radar apparatus constructed as described above.

Let $f_{TX}$ be the frequency of the transmit signal, $f_{RX}(i)$ be the frequency of the receive signal (where i=1, 2, ..., n), and fb(i) be the frequency of the beat signal (where i=1, 2, ..., n). Then the frequency fb(i) of the beat signal is expressed by the following equation.

$$fb(i) = |f_{TX} - f_{RX}(i)| \quad (7)$$

With an example of the radar apparatus to be mounted on automobiles, $f_{TX} \approx f_{RX}(i) \approx 60$ GHz and then fb(i)<100 kHz, approximately. When in this example the frequency fsw of the clock signal, which is the switching signal of the switch 3, is set to several MHz to several hundred MHz, the mixer 42 downconverts several hundred to several thousand cycles of each receive wave (in the 60 GHz band) from the respective channels (antenna elements) to repetitively generate beat signals of fb(i) from 1 to n in order.

Figure 6:
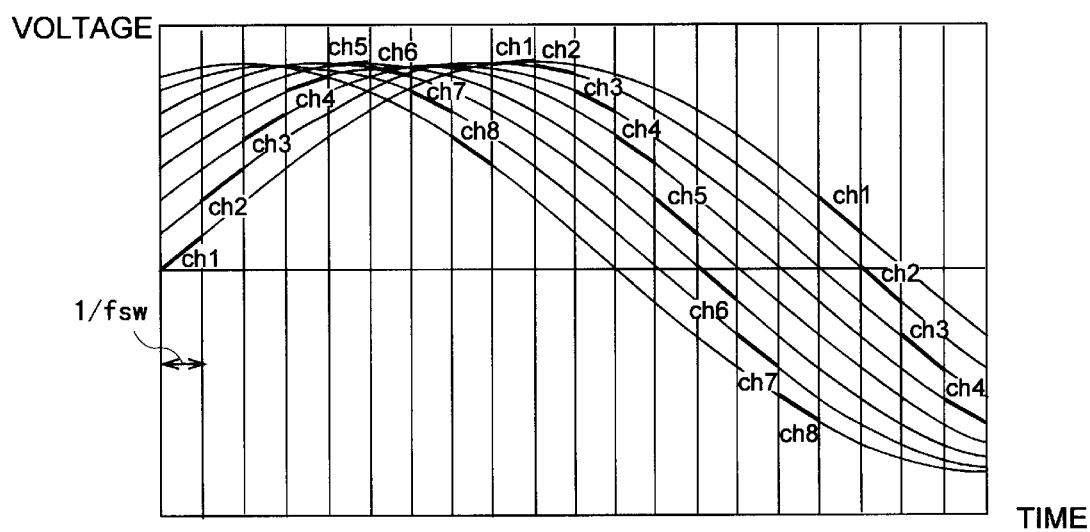
FIG. 6 is a graph to show signals downconverted in the first embodiment.

The downconverted signals are illustrated in FIG. 6. In this figure the number n of receive channels is set as n=8 and the value of fsw is decreased to a value close to fb(i) for simplicity. There is a small shift between phases of the beat signals obtained in the respective antenna elements of CH1 to CH8.

In FIG. 6, eight curved lines indicated by thin lines represent the beat signals in the case where each of the signals received by the respective channels (antenna elements) of the array antenna 2 is downconverted. Since the switching of channel is conducted at the frequency fsw by the switch 3 in the present embodiment, the beat signals obtained in the mixer 42 are chopped beat signals indicated by solid lines. Each of the chopped beat signals of the individual channels is input through the amplifier 43 and filter 44 into the A/D converter 45.

Figure 7:
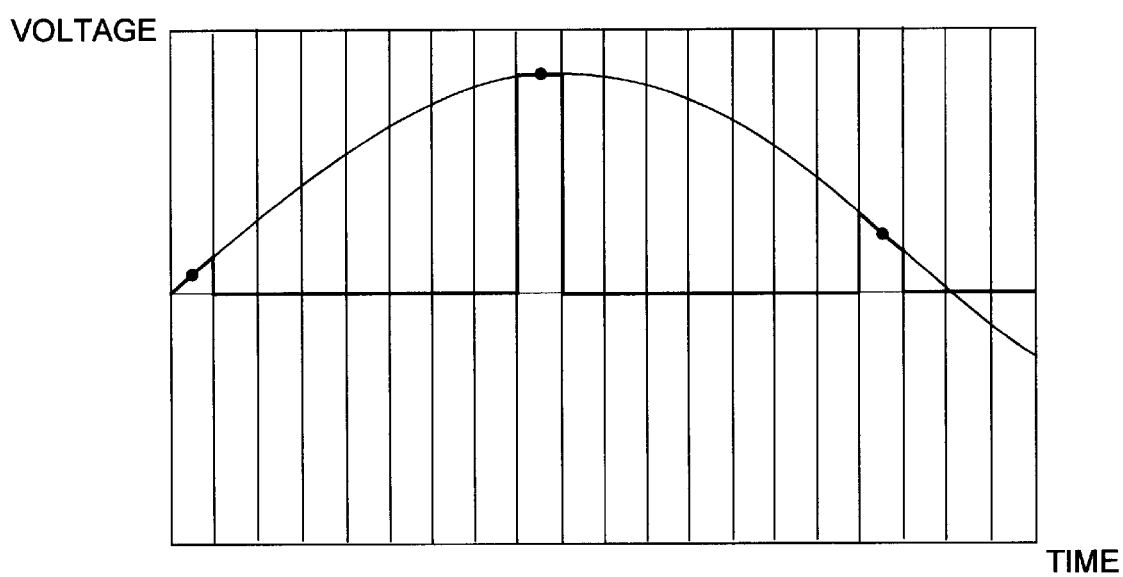
FIG. 7 is a graph to show the signal of the first channel extracted from FIG. 6.

Since the A/D converter 45 performs the A/D conversion in synchronism with the switching timing of the switch 3, there is 1:1 correspondence between the digital data after the A/D conversion and the channels. The timing of A/D conversion in each channel is slightly delayed from the switching timing of the switch 3, so as to be set at the center of a connection period. FIG. 7 is a graph to show the signal of the first channel extracted from FIG. 6, in which positions indicated by black dots are points of A/D conversion timing.

Then the digital signal processing section 5 accumulates fixed data amounts of the serial data of the eight channels, for example, data of 1024 points for each channel, in eight buffers. Each channel and each buffer are in 1:1 correspondence. The first buffer stores 1024 chopped digital beat signals of the first channel (only three of which are illustrated in FIG. 7), and likewise, the second buffer to the eighth buffer store the digital beat signals of the second channel to the eighth channel, respectively.

In this example, the value of fsw is decreased to a value close to fb(i) for simplicity of illustration, as described above. However, fsw>>fb(i) in practice, so that the period of the switching signal is much shorter relative to the period of the beat signals than that illustrated. Therefore, the beat signals are actually chopped finer. Regeneration of fb(i) is allowed up to the frequency where the sampling theorem holds (i.e., to fsw/(2×the number of channels)).

In the digital signal processing section 5, the data series separated in the respective channels are processed in a similar manner to those in the case of the conventional DBF radar apparatus for downconverting data for each channel. More specifically, after execution of the FFT process, the phase rotation process is carried out according to the idea of DBF as was stated referring to FIG. 4 and FIG. 5, a beam is synthesized at each direction angle, and the range to the object and the relative velocity of the object are computed according to aforementioned Eqs. (5) and (6) from frequencies of beat signals of each beam. In the last step the position and velocity of the object are determined from all these results.

Figure 8:
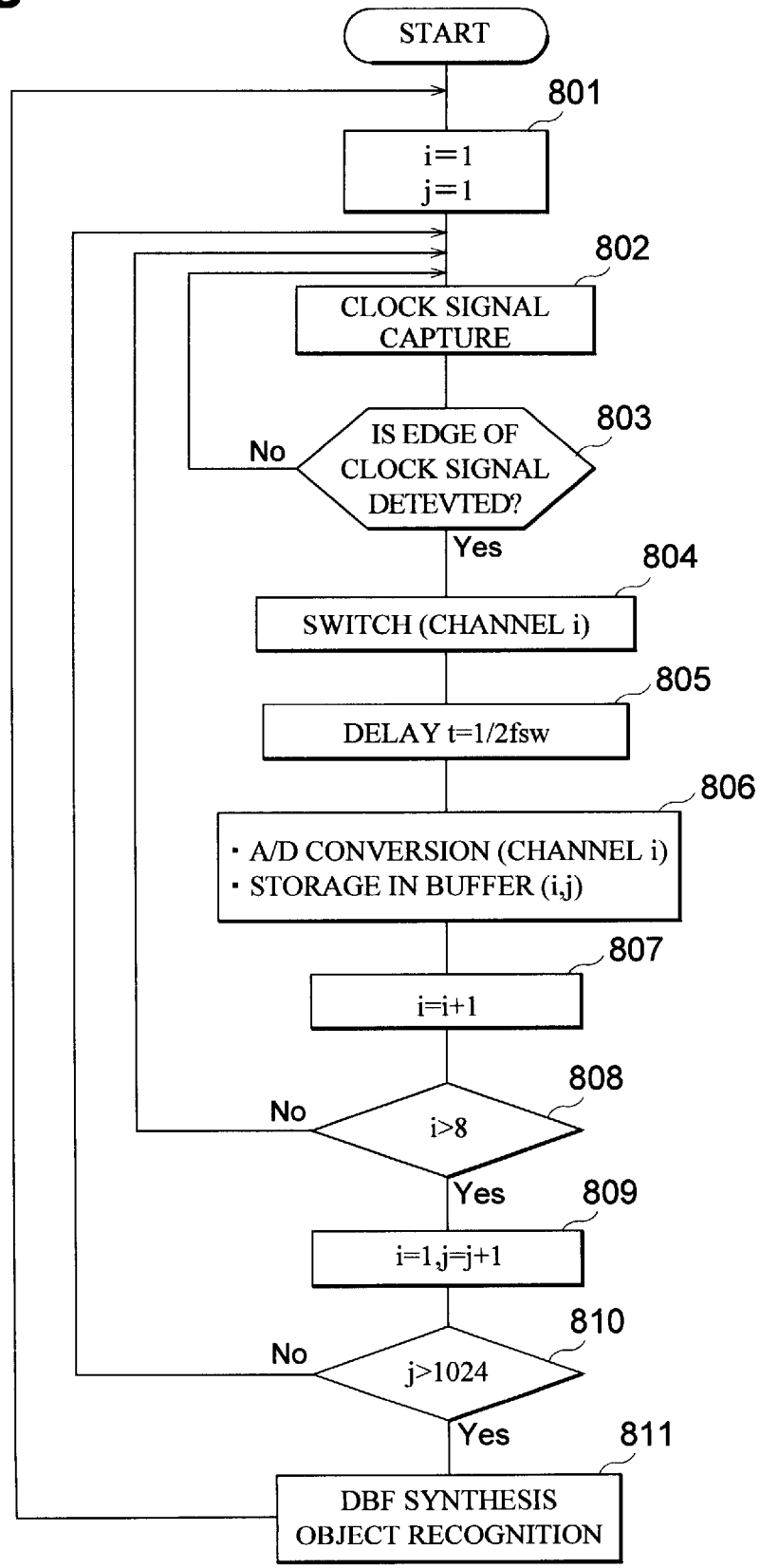
FIG. 8 is a flowchart to show the overall operation of the first embodiment.

FIG. 8 is a flowchart to show the whole of the sequential flow concerning the operation of the radar apparatus of the present embodiment detailed above. Let i represent a channel number and j represent a data sampling number. First, step 801 is to set i=1 and j=1. Then the clock signal fsw is taken in (step 802), and with detection of an edge of the clock signal the output terminal of the switch 3 is switched to the input terminal of CHi (steps 803, 804). Here, i=1 at this point, and thus the output terminal is connected to the input terminal of CH1.

Then the A/D converter 45 performs the A/D conversion process with a delay of the time t (t=1/(2 fsw)) which is half of the period of the clock signal, and digital data produced by the process is taken into the buffer in the digital signal processing section 5 (steps 805, 806). Since i=1 and j=1 at this point, the first sampled data is stored in the first system of buffer.

After that, a process of i=i+1 is carried out (step 807) and then the flow returns to step 802 to repeat the processes of steps 802 to 807 before the condition of i>8 is satisfied (step 808). This repetition causes the first sampled data to be stored in each of the first to the eighth buffers in the digital signal processing section 5.

When the condition of i>8 is satisfied in step 808, the flow moves to step 809 to set i=1 and j=j+1. Since j=1 so far, j=2 is set here. Step 810 is to determine whether j>1024. The processes of steps 802 to 809 are repeated before the condition of j>1024 is met. This repetition causes all sampled data of the first to the thousand twenty fourth points to be stored in each of the first to the eighth buffers in the digital signal processing section 5.

After that, DBF synthesis is conducted and then recognition of object is carried out based on the synthesis result (step 811).

Incidentally, in this embodiment, the data is not one obtained at the same time in a precise sense, because the measuring times of the respective channels are shifted each by 1/fsw. If the condition of fsw>>fb(i) holds adequately, for example, if the condition of fsw>(fb(i)×1000) approximately is met, the data can be synthesized as assuming that the data was obtained at the same time. Where such condition is not met, it is desirable to effect compensation commensurate with the frequency for the rotation amount (direction angle) of the phase rotation in each channel.

The compensation amount $\phi$ with respect to the reference of CH1 (no compensation) is given as follows:

$$\phi=(fb(i)/fsw)\times(i-1)\times 2\pi \tag{8}$$

where i=1, 2, . . . , n.

Figure 9:
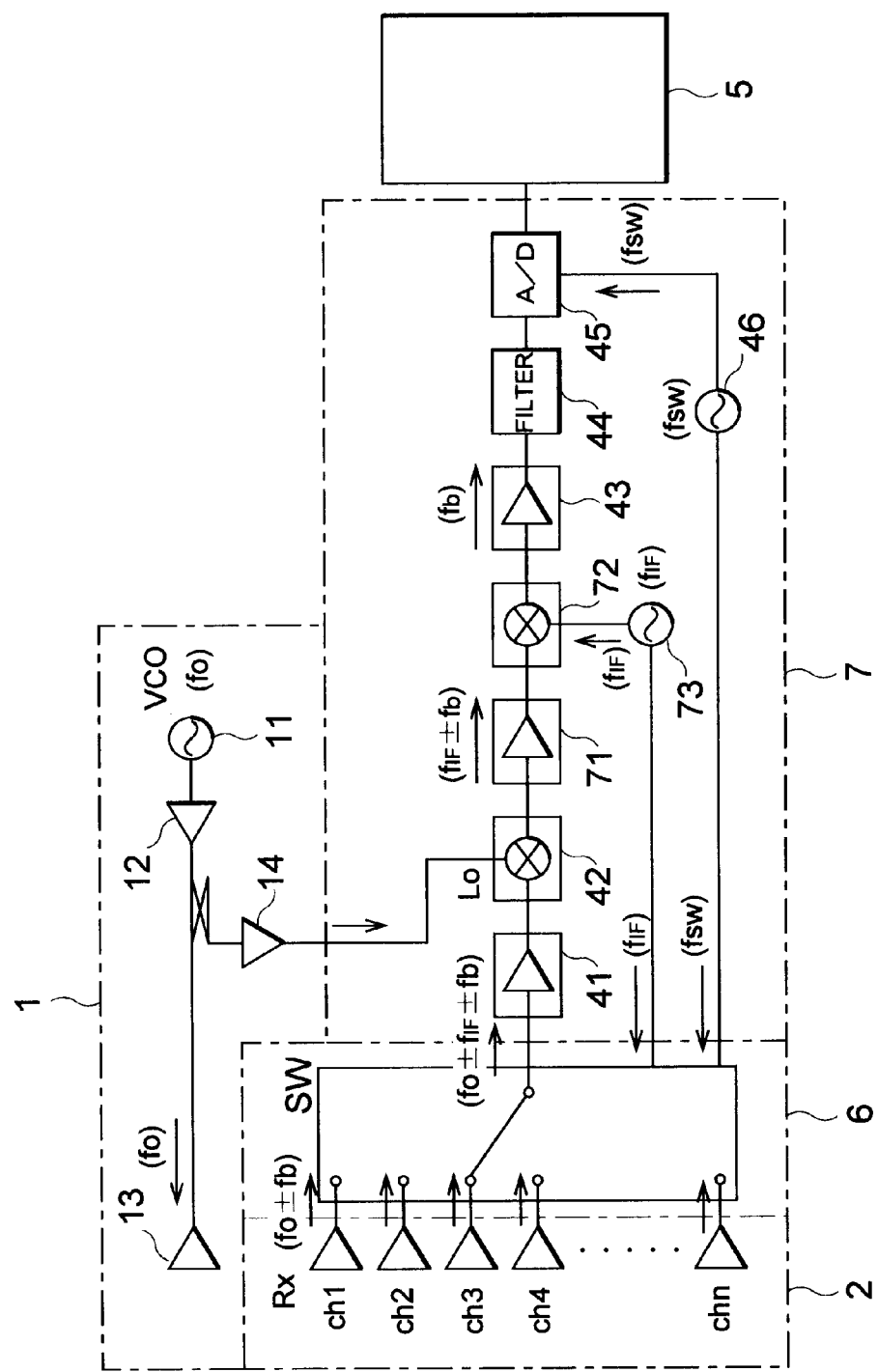
FIG. 9 is a structural diagram to show the radar apparatus of the second embodiment of the present invention.

Another embodiment of the present invention will be described below. FIG. 9 is a diagram to show the structure of the radar apparatus as the second embodiment of the present invention. The radar apparatus of the first embodiment is adapted to carry out the homodyne detection, whereas the radar apparatus of the present embodiment is adapted to perform heterodyne detection to reduce the noise.

It is not easy to perform heterodyne detection of high-frequency signals such as the microwaves and millimeter waves. This is because it is difficult to construct an oscillator for stably supplying the local signal of transmit frequency±intermediate frequency, which is used in down-converting the receive signal to the signal of the intermediate frequency, at low cost. The present embodiment is thus implemented as a radar apparatus without the need for such an oscillator.

In FIG. 9, the same elements as in FIG. 1 are denoted by the same reference symbols and the detailed description thereof is omitted herein. Switch 6 has n input terminals and one output terminal, similar to the switch 3 of FIG. 3, and the output terminal is connected to either one of the input terminals. The connection is switched at regular intervals by the switching signal (clock signal) from the oscillator 46. The switch 6 is different from the switch 3 in that the connection between the input terminal and the output terminals is interrupted by an intermittent signal supplied from the outside.

The receive section 7 is constructed in such structure that IF amplifier 71 and second mixer 72 are interposed in series between the mixer 42 and the amplifier 43 of the receive section 4 of FIG. 1. The receive section has an oscillator 73, in addition to the oscillator 46, and the oscillator 73 outputs the intermittent signal $f_{IF}$ having the frequency several ten times that of the switching signal. An example of the frequencies of the respective signals is as follows; the frequency f0 of the transmit signal is 60 GHz, the frequency $f_{IF}$ of the intermittent signal in the intermediate frequency band is 100 MHz, the frequency of the switching signal is 5 MHz, and the frequency of the beat signal is DC to 100 kHz, for example.

Next described is the operation of the radar apparatus of the present embodiment constructed as described above.

The receive signals (f0±fb) received by the respective antenna elements of the array antenna 2 are successively connected to the RF amplifier 41 in the order of CH1, CH2, . . . , CHn by the switch 6 and each channel connected undergoes repetitive on and off of the connection by the intermittent signal.

Figure 10:
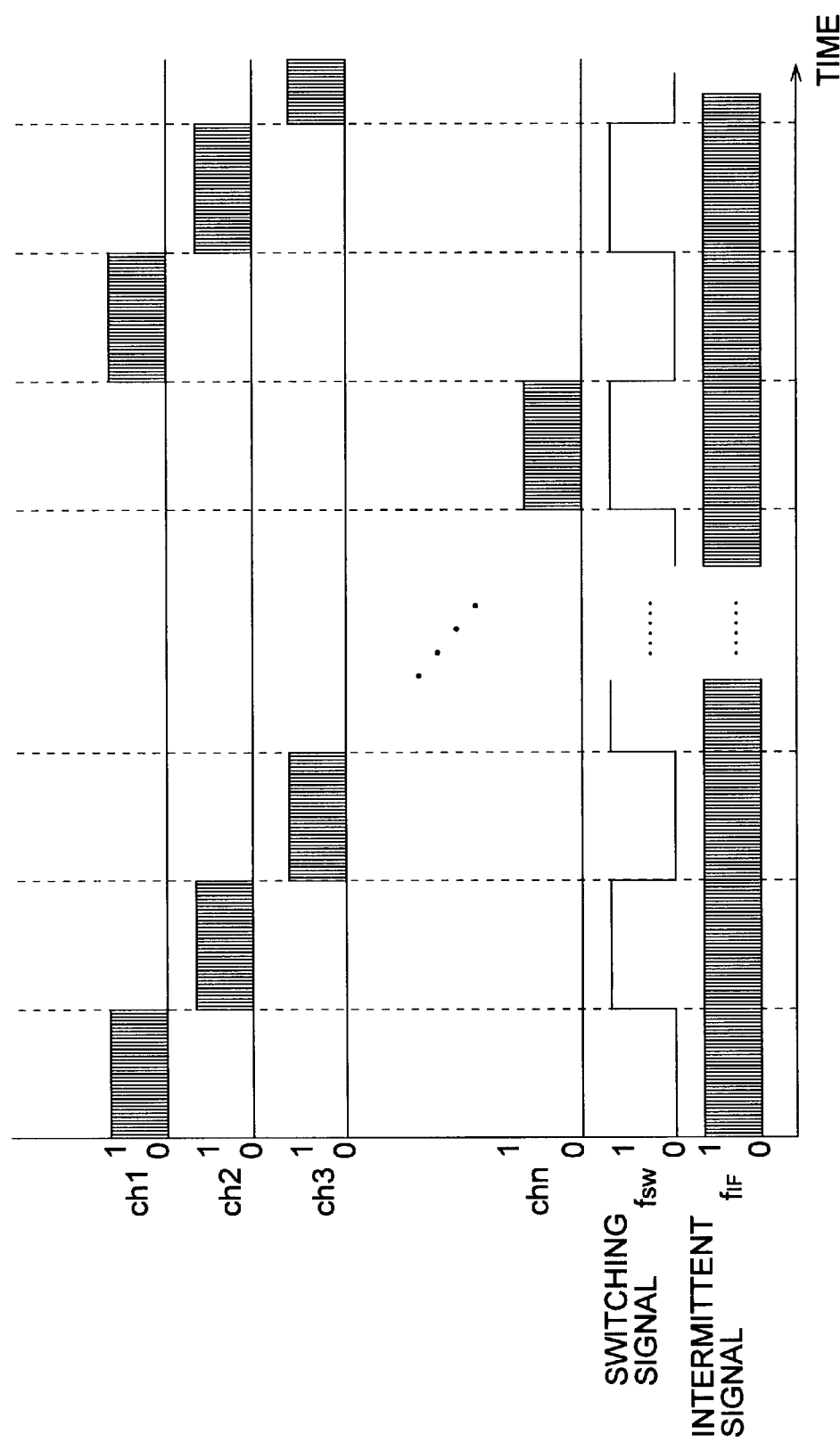
FIG. 10 is a timing chart to show the switching operation of switch 6.

FIG. 10 is a timing chart to show the switching in the switch 6. It is seen from this figure that switching of channel is effected at rise edges and fall edges of the switching signal of the frequency fsw and each channel selected in an alternative way by this switching is subjected to on and off of connection by the intermittent signal of the frequency $f_{IF}$.

The switching operation and intermittent operation in this switch 6 set the frequency of the signal outputted from the output terminal of the switch 6 to (f0±fb)±$f_{IF}$, i.e., f0±$f_{IF}$±fb.

When this signal is amplified by the RF amplifier 41 and thereafter input to the mixer 42, it is mixed with part of the transmit signal obtained from the RF amplifier 14, to obtain an intermediate signal having the frequency of $f_{IF}$±fb.

Figure 11:
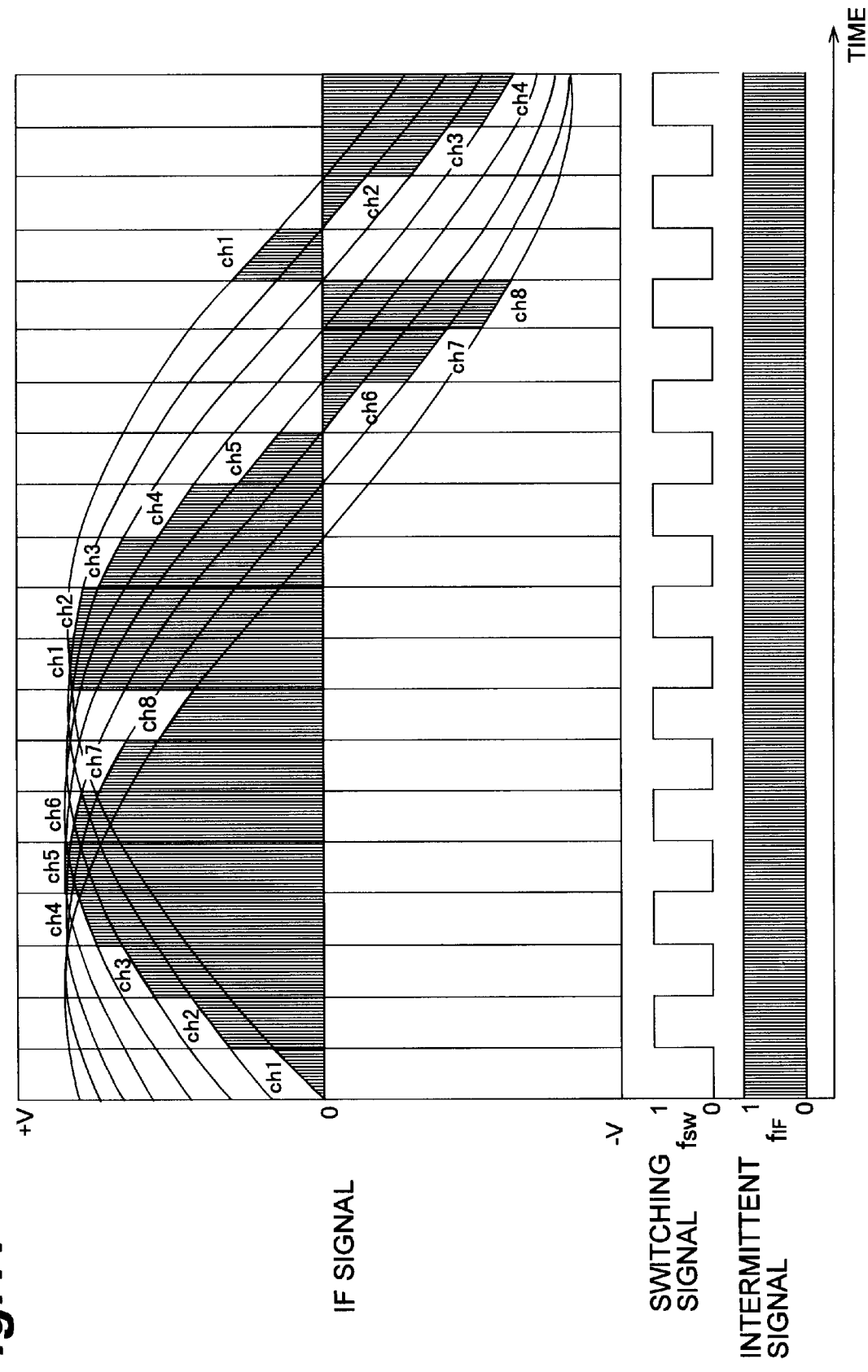
FIG. 11 is a timing chart to show output signals from mixer 42.

FIG. 11 is a timing chart to show intermediate signals outputted from the mixer 41. As apparent from this figure, each intermediate signal outputted from the mixer 41 is a signal amplitude-modulated by the beat signal of each channel with the intermittent signal of the frequency $f_{IF}$ as a carrier signal. For simplifying the description, FIG. 11 shows the case where the number n of receive channels is n=8 and fsw is decreased to a value close to fb(i), just as in the description of the first embodiment. There is also a small shift between the phases of the beat signals obtained from the respective antenna elements of CH1 to CH8.

Figure 12:
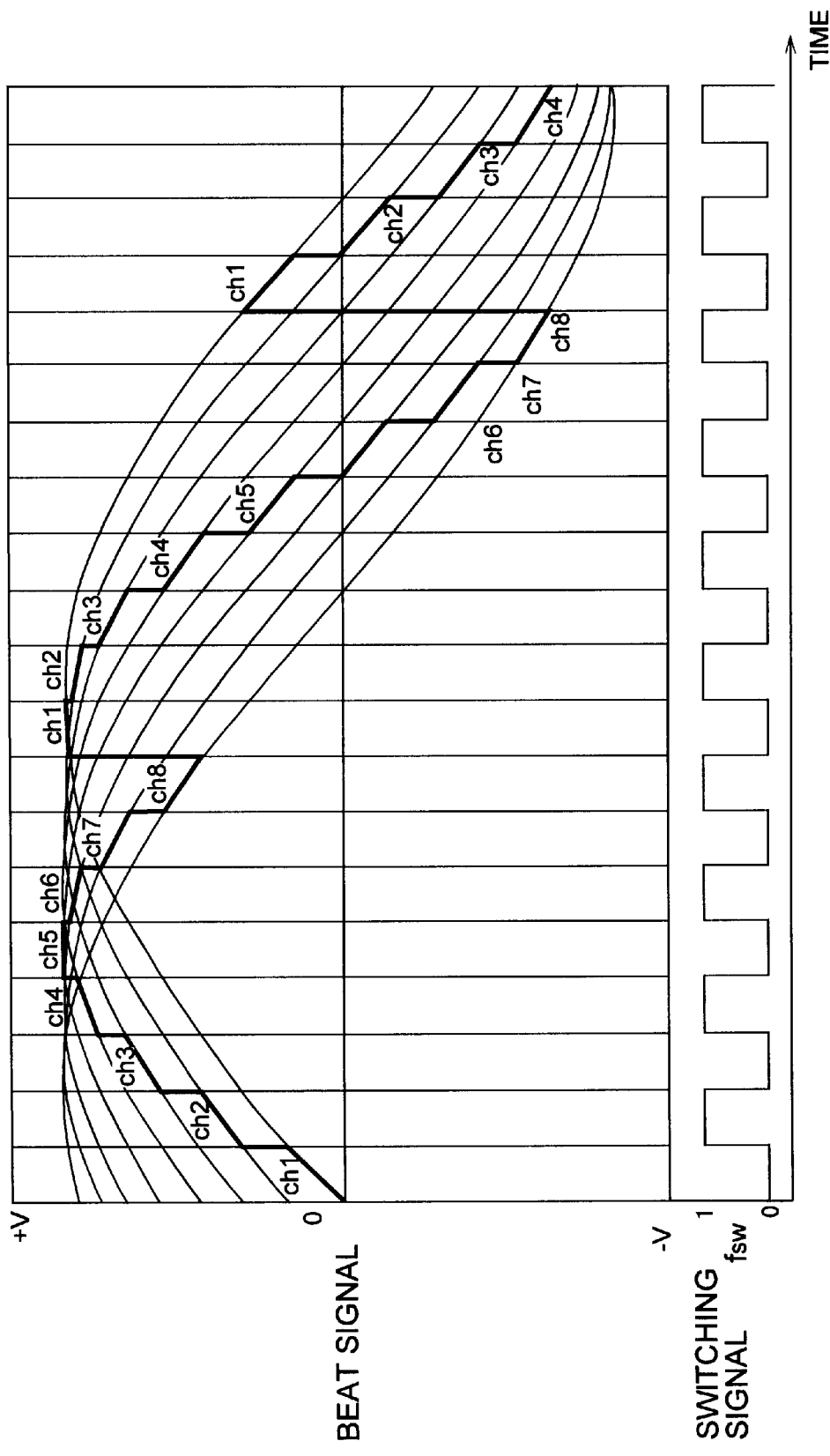
FIG. 12 is a timing chart to show output signals from second mixer 72.

When the intermediate signal of the frequency $f_{IF}$±fb obtained in this way is amplified by the IF amplifier 71 and thereafter mixed with the intermittent signal of the frequency $f_{IF}$ in the second mixer 72, the beat signals are obtained in succession in the sequence of the channels. FIG. 12 shows the beat signals outputted from the second mixer 72.

The processing thereafter is the same as in the first embodiment; the beat signal is input through the amplifier 43 and filter 44 to the A/D converter 45 to be subjected to A/D conversion in synchronism with the switching signal of the frequency fsw and the digital data output therefrom is supplied to the digital signal processing section 5. The processing in the digital signal processing section 5 is also similar to that in the first embodiment; the digital data input is subjected to the FFT process, thereafter the phase rotation process is effected thereon, a beam is synthesized in each direction angle, and the range to the object and the velocity of the object are computed from the frequencies of beat signals of each beam. In the final step the position and velocity of the object are determined from all these results.

Figure 13:
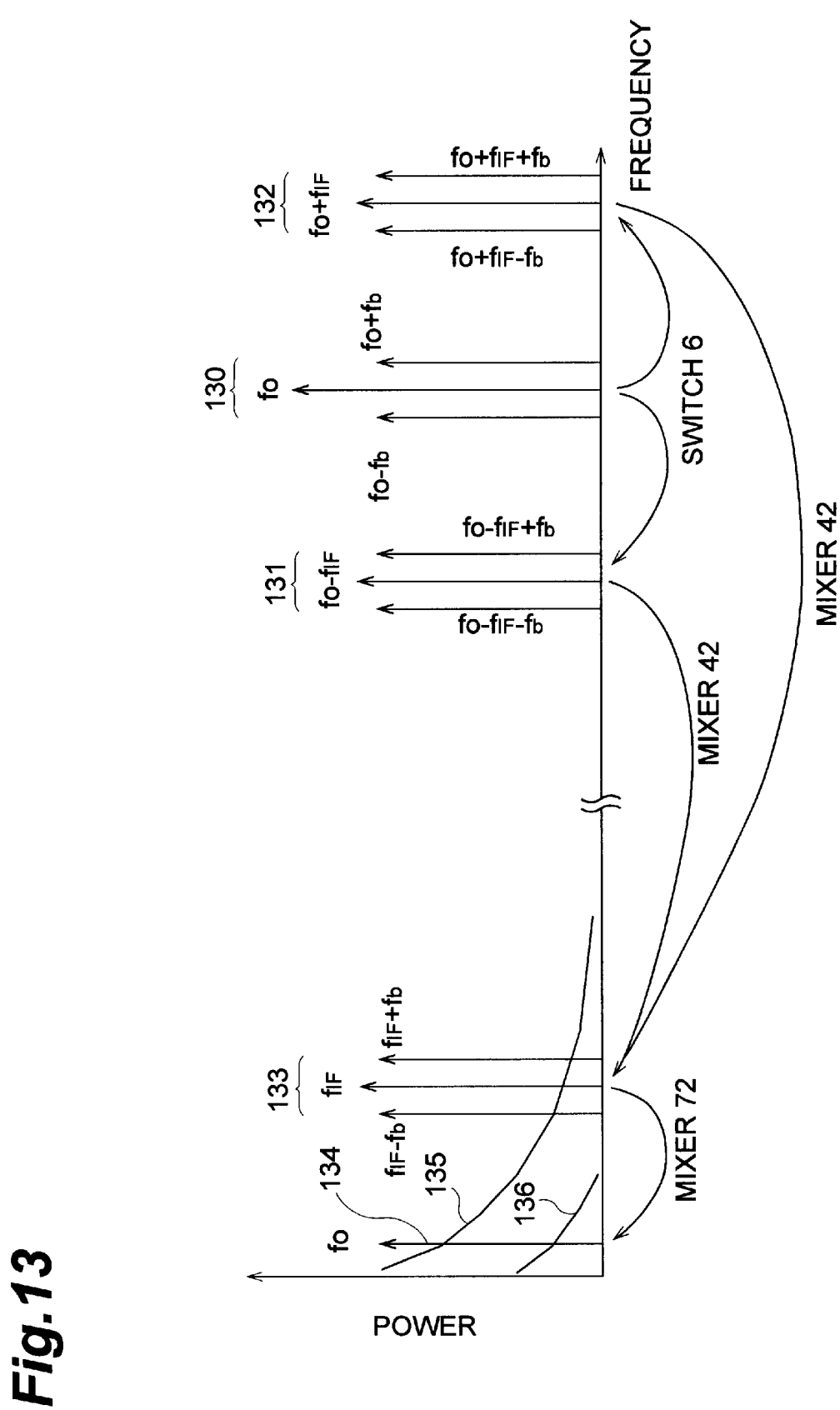
FIG. 13 is a spectral map to show the way of frequency conversion.

FIG. 13 is a spectral map to show the way of frequency conversion in the signal processing step in the present embodiment. In the radar apparatus of the present embodiment, the receive signal 130 is replaced with signals 131 and 132 by on and off according to the intermittent signal in the switch 6, thereafter they are downconverted to the intermediate signal 133 by the mixer 42, and subsequently, it is downconverted to the beat signal 134 by the second mixer 72.

In FIG. 13, a curve 135 represents the noise floor of the mixer 42 and a curve 136 the noise floor of the second mixer 72. As apparent from this figure, the mixer 42 performs the downconverting to the IF band where the influence of the noise thereof is lowered. Then the second mixer 72, which has lower noise in the low frequency region than the mixer 42, downconverts the signal to the beat signal. Accordingly, the noise margin becomes much larger than in the homodyne method.

Since the mixer 42 has a very wide frequency band, it normally demonstrates rather much 1/f noise and FM-AM conversion noise due to the FM-CW method in the low frequency region. In contrast, the second mixer 72 has a narrower frequency band and the noise floor thereof is thus lower. The present embodiment achieves expansion of the noise margin by taking advantage of this action.

If the frequency band of the IF amplifier 71 at the front end of the second mixer 72 is made narrower, the IF signal can be separated from the FM-AM conversion noise appearing in the low frequency region, whereby the low-frequency noise can be further decreased.

The first and second embodiments described above are the radar apparatus of the FM-CW method, but the present invention can also be applied to the radar apparatus of other methods where the position and relative velocity of object are determined using the difference signal between the transmit signal and the receive signal.

As detailed above, the radar apparatus of the present invention is implemented with only one set of expensive devices necessary for downconverting, for example, such as the RF amplifier and the mixer of high frequency band, irrespective of the number of antenna elements. The entire apparatus can be constructed at low cost and in compact size accordingly.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A radar apparatus comprising:

a transmit section for radiating a transmit signal in the form of an electromagnetic wave;

an array antenna comprised of a plurality of antenna elements for receiving a receive signal re-radiated from an object in the form of an electromagnetic wave when said transmit signal reaches the object;

switching means for connecting alternatively said antenna elements individually to a predetermined terminal by a switching signal;

a receive section for downconverting said receive signal obtained from said predetermined terminal by use of part of said transmit signal to generate a difference signal between said transmit signal and said receive signal, and converting said difference signal to a digital signal; and a digital signal processing section for subjecting the digital signal from said receive section to a predetermined process to detect a distance to said object or a relative velocity of said object;

wherein a frequency of said switching signal is set in a range smaller than a frequency of said transmit signal and larger than a frequency of said difference signal;

the conversion of the difference signal to a digital signal involves the digitization of a single sample of said difference signal and occurs successively after an antenna element is connected to the predetermined terminal in response to the switching signal; and an antenna element switch is executed after every conversion of the difference signal to a digital signal.

2. The radar apparatus according to claim 1, wherein said switching means is adapted to interrupt connection between said output terminal and said antenna elements by an intermittent signal of a frequency higher than the frequency of said switching signal and lower than the frequency of said transmit signal, and wherein said receive section is adapted to downconvert the receive signal from said switching means by use of the transmit signal and further downconvert said downconverted signal by use of said intermittent signal to generate said difference signal.

3. The radar apparatus according to claim 1, wherein said receive signal outputted from the output terminal of said switching means is subjected to phase compensation according to a frequency of said switching signal for each of said antenna elements.

4. The radar apparatus according to claim 2, wherein said receive signal outputted from the output terminal of said switching means is subjected to phase compensation according to a frequency of said switching signal for each of said antenna elements.

5. A radar apparatus comprising:

a transmit section for radiating a transmit signal in the form of an electromagnetic wave;

a receive antenna array comprising a plurality of antenna elements for receiving a re-radiated receive signal from an object in the form of an electromagnetic wave when said transmit signal reaches said object;

switching means for sequentially connecting said antenna elements individually to the single output terminal of said switching means, and wherein said switching means is sequentially switched by application of a switching signal;

a receive section for downconverting said receive signal from the switching means output terminal and for combining a part of said transmit signal with the receive signal to generate an analog difference signal, and including A/D means for converting said analog difference signal to a digital difference signal, wherein sequential individual analog difference signals are generated, as individual antenna elements are sequentially connected to said switching means output terminal in response to said switching signal applied to said switching means, following conversion of said sequentially generated analog difference signal to a digital difference signal, and wherein said switching signal has a frequency less than the transmit signal frequency but greater than the frequency of the difference signal; and a digital signal processing means connected to the A/D means for processing said sequential digital difference signals to detect the distance to said object or the relative velocity of said object.

* * * * *

UNITED STATES PATENT AND TRADEMARK OFFICE
CERTIFICATE OF CORRECTION

PATENT NO.: 5,955,991

DATED: September 21, 1999

INVENTOR(S): Atsushi Kawakubo

It is certified that an error appears in the above-identified patent and that said Letters Patent is hereby corrected as shown below:

Claim 5, col. 10, line 63, "AID" should read --A/D--.

Signed and Sealed this

Seventh Day of March, 2000

Attest:

Attesting Officer

Q. TODD DICKINSON

Commissioner of Patents and Trademarks